US012613707B2

(12) United States Patent
Leonardi et al.

(10) Patent No.: US 12,613,707 B2
(45) Date of Patent: *Apr. 28, 2026

(54) ELECTRONIC AVIONICS SYSTEM WITH ADDITIONAL CONFIGURATION FILE

(71) Applicant: THALES, Meudon (FR)

(72) Inventors: Nicolas Leonardi, Merignac (FR); Pierrick Lamour, Merignac (FR)

(73) Assignee: THALES, Meudon (FR)

( * ) Notice: Subject to any disclaimer, the term of this patent is extended or adjusted under 35 U.S.C. 154(b) by 109 days.

This patent is subject to a terminal disclaimer.

(21) Appl. No.: 18/635,325

(22) Filed: Apr. 15, 2024

(65) Prior Publication Data

US 2024/0354115 A1     Oct. 24, 2024

(30) Foreign Application Priority Data

Apr. 20, 2023     (FR) ...................................... 2303954

(51) Int. Cl.
*G06F 9/4401*          (2018.01)
*G06F 9/445*           (2018.01)

(52) U.S. Cl.
CPC ........ *G06F 9/4403* (2013.01); *G06F 9/44505* (2013.01); *G06F 9/4401* (2013.01); *G06F 9/4411* (2013.01)

(58) Field of Classification Search
CPC .. G06F 9/4401; G06F 9/44505; G06F 9/4403; G06F 9/4411

(Continued)

(56) References Cited

U.S. PATENT DOCUMENTS 8,291,312 B1 * 10/2012 Zhou ..................... G06F 16/972
                                                        715/236
9,619,252 B2 *  4/2017 Lopez ....................... G06F 8/65
                    (Continued)

FOREIGN PATENT DOCUMENTS

CN          104239095 A      12/2014
EP            4231142 A1      8/2023
                    (Continued)

OTHER PUBLICATIONS

FR 2303954, INPI Rapport de Recherche Preliminaire, Oct. 10, 2022, 2 pages.

*Primary Examiner* — Ji H Bae
(74) *Attorney, Agent, or Firm* — Soquel Group LLC

(57)          ABSTRACT
Avionics system includes a bootstrap package including system partitions, and a primary configuration table, of a first type with hardware resource configuration values, a boot automaton launching the bootstrap package, at least one secondary configuration table of a second type with configuration values usable by a set of partitions, tertiary system configuration tables for the set of partitions, of a third type with configuration values used by a respective partition, application partitions, each including an avionics application and a tertiary configuration table, of the third type and containing configuration values of resources used by the respective application partition. The boot automaton checks whether an additional configuration file is present, and launches the additional configuration file including at least one configuration table of the first, second or third type, same being used instead of a table of the same type among the primary, secondary, tertiary system and tertiary application tables.

15 Claims, 8 Drawing Sheets

(58) Field of Classification Search
USPC ................................................. 713/1, 2, 100
See application file for complete search history.

(56) References Cited

U.S. PATENT DOCUMENTS

| | | | | |
|---|---|---|---|---|
| 11,153,160 | B1 * | 10/2021 | Davis ................. | H04L 41/0816 |
| 2015/0347153 | A1 * | 12/2015 | Chou ................... | G06F 3/0683 |
| | | | | 713/1 |
| 2022/0066907 | A1 * | 3/2022 | Hochwarth ............ | G06F 12/14 |
| 2024/0354122 | A1 * | 10/2024 | Leonardi .............. | G06F 9/4401 |

FOREIGN PATENT DOCUMENTS

| | | | |
|---|---|---|---|
| FR | 3045879 | A1 | 6/2017 |
| WO | 2023005371 | A1 | 2/2023 |

* cited by examiner

ELECTRONIC AVIONICS SYSTEM WITH ADDITIONAL CONFIGURATION FILE

CROSS-REFERENCE TO RELATED APPLICATIONS

This application is a U.S. non-provisional application claiming the benefit of French Application No. 23 03954, filed on Apr. 20, 2023, which is incorporated herein by reference in its entirety.

TECHNICAL FIELD OF THE INVENTION

The present invention relates to an electronic avionics system intended to be carried on board an aircraft, the avionics system comprising a computer platform apt to execute a set of application partitions, each including an avionics software application, including resources and hosting an operating system.

The invention relates to the field of configuration of software applications, more particularly avionics applications, loadable on a computer platform comprising resources, including a processor and at least one memory.

Such software applications, also known as Loadable Software Parts (LSPs), are generally configurable:
- either at design time, by integrating, during the generation thereof, configuration values adapted to the context of running of the respective software application;
- either at run time, by searching for the configuration in a software or hardware memory area provided for this purpose. It is then necessary to program said memory zones beforehand with the appropriate configuration parameters.

Such loadable avionics software applications are typically as per the standard ARINC 665, also denoted by A665, in the version A665-3 thereof of Dec. 8, 2005 and subsequent versions.

BACKGROUND OF THE INVENTION

In the case of software applications configurable at design, an avionics electronic system is known comprising a set of application partitions, each including at least one avionics software application and at least one configuration table of resources used by a respective partition; a configuration table of resources usable by the set of application partitions; and a computer platform apt to run the set of application partitions(s), the platform including resources including hardware resources and hosting an operating system, the hardware resources including a processor, a random-access memory and a storage memory. The computer platform further includes, in the storage memory, a bootstrap package including a kernel, at least one resource driver, a set of system partitions and a hardware resource configuration table, each system partition including at least one operating system service; and a boot automaton apt to be executed first after the platform is powered up and configured to launch the bootstrap package.

The advantage of configuring software applications at design is to ensure better control of the configuration taken into account, to not need to add robustness to the configuration values, and to facilitate certification, more particularly an ETSO (European Technical Standard Order) certification of the software applications by making it possible to accurately characterize the performance of the platform at design, without any possible variation related to a user context at run time.

However, changes of the context of running software applications very often require the need to generate new versions of software applications, integrating the new configuration values.

SUMMARY OF THE INVENTION

The goal of the invention is then to propose an avionics electronic system facilitating the taking into account of changes in the context of running software applications.

To this end, the invention relates to an electronic avionics system intended to be carried on board an aircraft, the avionics system comprising:
- a computer platform apt to run a set of application partitions(s), having resources including hardware resources and hosting an operating system, the hardware resources including a processor, a random-access memory and a storage memory;
- the computing platform further including in the storage memory:
  - a bootstrap package including a kernel, at least one resource driver, a set of system partitions and a primary resource configuration table, each system partition including at least one operating system service, the primary table being of a first type containing hardware resource configuration values; and
  - a boot automaton that can be executed first after the platform is powered up and configured to launch the bootstrap package;
- at least one secondary resource configuration table, stored in the storage memory, each secondary table being of a second type containing resource configuration values usable by a respective set of application or system partitions, the second type being distinct from the first type;
- a set of system tertiary resource configuration tables for the set of system partitions, stored in the storage memory, each system tertiary table being of a third type containing resource configuration values used by a respective partition, the third type being distinct from the first type and from the second type;
- the set of application partitions, stored in the storage memory, each application partition including an avionics software application and an application resource configuration tertiary table, each application tertiary table being of the third type and containing configuration values of the resources used by the respective application partition;
- the boot automaton being configured to check whether an additional configuration file is present in the storage memory, and then to launch the additional configuration file,
- the additional configuration file including at least one resource configuration table of a type chosen from the first, second and third types; each table of the additional configuration file being then used instead of a respective table of the same type among the primary, secondary, tertiary system and tertiary application tables.

With the avionics system according to the invention, the additional configuration file including at least one resource configuration table, facilitates taking into account changes in the context of running the software application(s) by allowing new configuration values to be added after the design of said software application(s).

In other words, the avionics system according to the invention then serves to configure the software applications at design, with the associated advantages, while allowing new configuration values to be added after said design, thereby overcoming the aforementioned drawback.

Preferentially, the boot automaton is configured to launch the additional configuration file before the bootstrap package if the additional configuration file includes a table of the first type, i.e. containing configuration values of the hardware resources, and the or each configuration table of the additional storage memory configuration file 36 e.g. then replacing the configuration table of the same type among the primary, secondary and tertiary tables.

Also preferentially, if the additional configuration file includes a hardware resource configuration table, i.e. a table of the first type, then the configuration values of hardware resources contained in said table each belong to ranges of values for which the computer platform has been previously certified, which makes it possible to retain the benefit of the certification carried out, and then to avoid a new certification, or recertification.

Also preferentially, the additional configuration file consists of the at least one configuration table, and the additional configuration file is then easier to generate and faster to load than a new version of the bootstrap package modified so as to insert the new configuration values.

According to other advantageous aspects of the invention, the avionic system comprises one or a plurality of the following features, taken individually or according to all technically possible combinations:

if, when checking for the presence of said additional configuration file, the storage memory does not contain any additional configuration file, then the boot automaton is configured to launch the bootstrap package;

if the additional configuration file includes a table of the first type, then the boot automaton is configured to run the additional configuration file before the bootstrap package;

the boot automaton is configured to launch the additional configuration file only if at least one launch condition is met, each launch condition being chosen from the group consisting of: an authenticity check of the additional configuration file, and an integrity check of the configuration add-on file;

the boot automaton is preferentially configured to launch the additional configuration file only if all launch conditions are met among the authenticity check of the additional configuration file and the integrity check of the additional configuration file;

the computer platform is apt to operate according to a mode of operation chosen at least from a degraded mode where only the set of system partitions is executable among the sets of system partitions and application partitions, and an operational mode where the sets of system partitions and application partitions are each executable;

the avionics system comprises a resource configuration table of the second type for each of the modes of operation among the degraded mode and the operational mode, the second type table for degraded mode containing resource configuration values usable by the set of system partitions and the second type table for the operational mode containing resource configuration values usable by the set of application partitions;

the avionics system comprises, for each system partition, a resource configuration table of the third type for each of the modes of operation among the degraded mode and the operational mode, each third type table associated with a respective system partition for the degraded mode containing the configuration values of the resources used by said system partition for the degraded mode and each third type table associated with a respective system partition for the operational mode containing the resource configuration values used by said system partition in operational mode;

the bootstrap package and the additional configuration file each include at most one configuration table of the first type;

if the additional configuration file includes a configuration table of the first type, then the hardware resource configuration values contained in said table each belong to value ranges for which the computer platform has been previously certified;

the bootstrap package and/or the additional configuration file include a plurality of configuration tables of the second type and/or a plurality of configuration tables of the third type;

the avionics system comprises, in the storage memory, at least one additional configuration file;

the avionics system preferentially comprising a plurality of additional configuration files;

such as a first additional configuration file including at least one configuration table, one of which is of first type and at least one other additional configuration file including at least one configuration table of a type chosen from the second and third types;

the or each additional configuration file includes only at least one configuration table of a type chosen from the first, second and third types;

The or each additional configuration file preferentially consists of at least one configuration table of a type chosen from the first, second and third types; and the avionics system further includes a display screen and/or a human-machine interface.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

Figure 1:
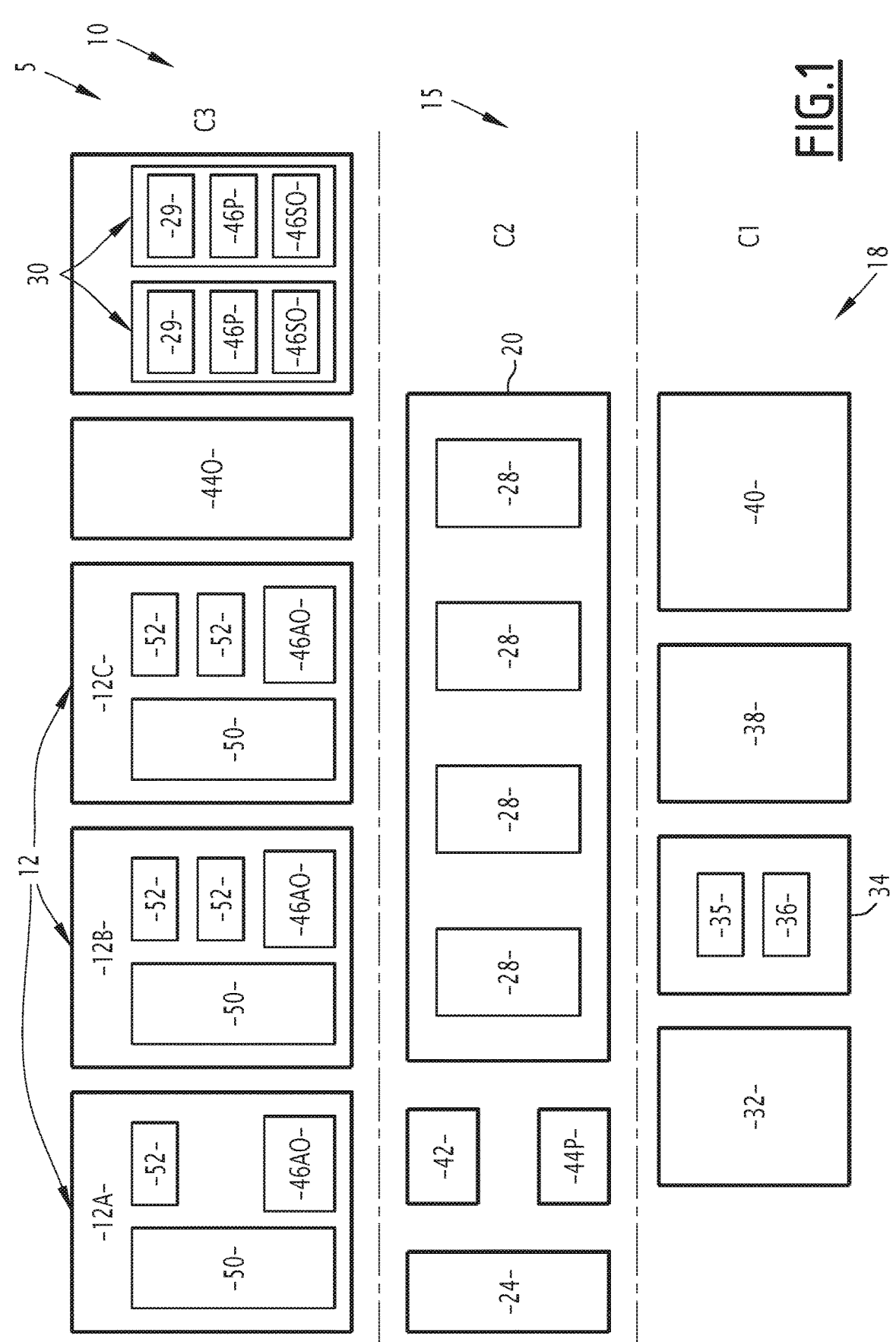
FIG. 1 is a schematic representation of an aircraft equipped with an avionics electronic system comprising a set of application partitions and a computer platform apt to run the application partitions, the platform having resources, including hardware resources including a processor, a random-access memory and a storage memory, and hosting an operating system; the platform further including a boot automaton and a bootstrap package including a kernel, a resource driver, a set of system partitions; the avionics system comprising primary, secondary and tertiary resource configuration tables, said tables being of first, second and third types, respectively; the boot automaton being configured to check whether at least one additional configuration file including at least one configuration table is present in the storage memory and to launch, where appropriate, the additional configuration file; at least one table of the additional configuration file being then used instead of at least one respective table of the same type.

In FIG. 1, an aircraft 5 is equipped with an avionics electronic system 10 comprising a set of application partitions 12 and a computer platform 15 apt to run the set of application partitions 12.

The aircraft 5 is preferentially an airplane. In a variant, the aircraft 5 is a helicopter, or a drone which can be remotely piloted by a pilot.

The computer platform 15 includes 18 resources and hosts an operating system 20. The computer platform 15 further includes a bootstrap packet 22, visible in FIGS. 2-8, and a boot automaton 24 apt to be executed first after the platform 15 has been powered up and configured to launch the bootstrap package 22.

Advantageously, the computer platform 15 further includes a first additional configuration file 26, visible in FIGS. 2-8 and described in greater detail thereafter.

The operating system 20, also called OS, is e.g. an operating system as per the standard ARINC 653, or a POSIX operating system, or a hypervisor, or yet a middleware.

A skilled person would then understand that the operating system 20 is understood in a broad sense and is, more generally, a set of at least one basic software 28, designed to provide services 29 of different types to each application partition 12 and or system partition 30.

A service 29 is thus a function of the basic software that can be used by the application or applications and that can be reached by a call, also called a service call (of the OS) or a system call. An example of basic software is an ARINC 653 or POSIX OS that provides such services. In the context of the invention, a skilled person would understand that it is the notion of calling a service that matters, and not the service as such, provided by the basic software.

The services 29 provided by the operating system 20 are known per se and are e.g. input/output acquisition services, process management services, communication protocol management services, etc. The types of service are then the input/output acquisition, the process management, the communication protocol management and the management of timing, more particularly the initiation thereof.

The avionics system 10 further comprises a set of system partitions 30, each system partition 30 including at least one service 29 of the operating system 20.

The resources 18 of the platform 15 are physical, i.e. hardware, or logical elements suitable for being made available to the avionics software application(s) 12 or system partitions 30.

The resources 18 include hardware resources, in particular a processor 32 and memory resources 34, such as random-access memory 35 and a storage memory 36. The storage memory 36 is e.g. a programmable read-only memory, such as a prom or FPROM (Field Programmable Read Only Memory).

In addition, the resources 18 include input and output resources 38, also called IO (Input Output) resources, and graphic type resources 40 serving to display data.

In addition again, the resources 18 include resources (not shown) specific to the avionics network. Such resources are e.g. the communication routers of an ARINC664 network, more particularly ARINC664 Part 3 or ARINC664 Part 7.

The computer platform 15 is typically apt to operate according to a mode of operation chosen at least from a degraded mode, also denoted by PDL, where only the set of system partitions 30 is executable among the sets of system partitions 30 and application partitions 12, and an operational mode, also denoted by OPS, where the sets of system partitions 30 and of application partitions 12 are each executable.

The bootstrap package 22 includes a kernel, at least one resource driver, a respective set of system partitions 30 and a primary resource configuration table 42, each system partition 30 including at least one service 29 of the operating system 20, the primary table 42 being of a first type, denoted by HWCT.

In addition, the avionics system 10 comprises at least one secondary resource configuration table 44 stored in the storage memory 36, each secondary table 44 being of a second type, denoted by MGCT, the second type MGCT being distinct from the first type HWCT.

Advantageously, the avionics system 10 comprises at least two distinct secondary tables 44, at least one denoted by 44O being provided for the computer platform 15 in the operational mode of operation, and at least the other denoted by 44P being provided for the computer platform in the degraded mode of operation. Each secondary resource configuration table 44O associated with the operational mode of operation contains configuration values for resource configuration, usable by a respective set of application partitions. Each secondary resource configuration table 44P associated with the degraded mode of operation contains configuration values for resource configuration, usable by a respective set of system partitions.

In addition again, the avionics system 10 comprises a set of tertiary system tables 46SO, 46P for resource configuration for the set of system partitions 30, stored in the storage memory 36. Each system tertiary table 46SO, 46P is of a third type, the HACT type. The third type, HACT, is distinct from both the first type HWCT and from the second type, MGCT. In the example shown in FIG. 1, each system tertiary table 46SO, 46P is included in a respective partition 30.

Advantageously, the avionics system 10 comprises a resource configuration table of the second type, MGCT, for each of the modes of operation among the degraded mode 44P and the operational mode 44O. The second type table for the degraded mode 44P consists of the resource configuration values that can be used by the set of system partitions 30. The table of the second type for the operational mode 44O consists of the resource configuration values usable by the set of application partitions 12.

Also advantageously, the avionics system 10 comprises, for each system partition 30, a resource configuration table of the third type, HACT, for each of the modes of operation among the degraded mode PDL and the operational mode OPS. Each table of the third type associated with a respective system partition 30 for the degraded mode HACT_PDL consists of the configuration values of the resources used by said system partition 30 in the degraded mode PDL. Each table of third type associated with a respective system partition 30 for the operational mode 46SO consist of resource configuration values used by said system partition 30 in the operational mode OPS.

Each application partition 12 includes an avionics software application 50 and a tertiary application table 46AO for configuring resources. Each tertiary application table 46AO is of the third type, HACT, and contains resource configuration values used by the respective application partition 12. Each avionics software application 50 is intended to be executed by the platform 15 and is then designed to send one or a plurality of calls to the operating system 20 and is also configured to use the resources 18 of the platform.

Each application partition 12 is apt to be executed only in operational mode OPS and is not executed in the degraded mode PDL. Each system partition 30 is apt to be executed in both the operational mode OPS and in the degraded mode PDL.

In addition, each application partition 12 also includes at least one library 52. Each library 52 is a set of functions, classes, interfaces or software modules that are grouped together so that the respective avionics software application 50 can use same easier. The functions, classes, interfaces or even software modules of a respective library 52 concern e.g. the management of databases, the manipulation of files, the development of graphics, or else the communication with other avionics software applications 50. When the software application 50 is run, the library or libraries 52 of the corresponding application partition 12 are loaded into memory and the elements that same contains are then apt to be called from the code of the application 50.

Each application partition 12 typically includes, and preferentially consists of, a single avionics software application 50 and one or a plurality of libraries 52 associated with the avionics software application.

In the example shown in FIG. 1, the avionics system 10 comprises three application partitions 12, namely a first application partition 12A, a second application partition 12B and a third application partition 12C. In said example, the first application partition 12A contains only one library 52, and the second and third application partitions 12B, 12C each contain two libraries 52.

A configuration table of the first type, HWCT, contains configuration values for the hardware resources of the computing platform 15, and then forms a configuration table for the hardware resources of the platform 15. The configuration table of the first type, HWCT, typically comprises the values of the following quantities: frequency of operation of the processor 32; number of cores of the processor 32; quantity of random-access memory, i.e. size of the random-access memory 35 quantity of cache memory, i.e. size of the memory of the processor 32; number of inputs-outputs among the IO resources 38; frequencies supported as per the standard ARINC 429, prescaler coefficient value to be programmed for message dating, etc.

A configuration table of the second type, MGCT, contains resource configuration values usable by a respective set of partitions, e.g. by the set of application partitions 12, or else by the set of system partitions 30, respectively.

Since the computer platform 15 can be included in different avionics systems 10 and/or of being positioned in different positions on board the aircraft 5, the resources 18 usable by a respective set of partitions 12, 30 do not necessarily correspond to all the resources that can be supported on the platform 15. The usable resources generally correspond only to a portion of said resources 18, strictly smaller, i.e. more reduced, than all of said resources 18, the values of which are directly related to the position of the computer platform 15 on board the aircraft 5.

The configuration table of the second type, MGCT, typically comprises the values of the following quantities: quantity of time of the processor 32 usable by the respective set of partitions 12, 30; number of cores of the processor 32 usable by said set of partitions 12, 30; quantity of random-access memory 35 usable by said set of partitions 12, 30; quantity of cache memory usable by said set of partitions 12, 30; input-output identifier(s) usable by said set of partitions 12, 30; coefficients of acceleration of the movement of cursors on touch screens included in the graphic resources 40; threshold for triggering a partition sanction 12, 30 by a monitoring module of the computer platform 15. The partition sanction typically depends on an authorization associated or not associated with the partition 12, 30 subject to the sanction. When the partition 12, 30 is a partition with authorization, e.g. with module level rights, the partition sanction is a reboot of the platform 15. When the partition 12, 30 is an unauthorized partition, e.g. without module level right, the partition sanction is a reboot of the partition 12, 30 concerned.

A configuration table of the third type, HACT, contains resource configuration values used by a respective partition 12, 30, e.g. by a respective application partition 12, or else by a respective system partition 30.

Preferentially, each configuration table of the third type, HACT, for a respective application partition 12, as well as each configuration table of the third type, HACT, for a respective system partition 30, should be compatible with the budgets of the configuration table of the second type, MGCT, for the sets of application partitions 12 and of system partitions 30. In other words, the sum of the configuration values contained in all the respective configuration tables of the third type, HACT, should not exceed same contained in the corresponding configuration table of the second type, MGCT.

The configuration table of the third type, HACT, typically comprises the values of the following quantities: identifier(s) of time window(s) of the processor 32 used by the respective partition 12, 30; identifier(s) of core(s) of the processor 32 used by said partition 12, 30; identifier of a zone of the random-access memory 35 used by said partition 12, 30; definition of the objects such as a communication port (name, size, refresh frequency, etc.) and identifier of the resource concerned among the inputs-outputs used by said partition 12, 30.

In the example shown in FIG. 1, the avionics system 10 is represented as a stack of layers C1, C2, C3; namely a first layer C1, also called a hardware layer; a second layer C2 above the first layer C1, the second layer C2 also being called an operating layer, or OS layer; and a third layer C3, also called the partitions layer, above the second layer C2.

The first layer C1 then includes the resources 18. The second layer C2 includes the operating system 20, the boot automaton 24, the primary table 42 and the secondary table 44P associated with the degraded mode of operation. The third layer C3 includes the set of application partitions 12, the set of system partitions 30, the secondary table 44O associated with the operational mode of operation, and the system and application tertiary tables 46SO, 46AO, being recalled that the application tertiary tables 46AO are included directly in the application partitions 12.

A skilled person would then observe that the computer platform 15 corresponds to the first and second layers C1, C2 of the avionics system 10.

In the examples shown in FIGS. 2-7, the avionics system 10 is represented in the form of functional levels, with a first functional level N1 corresponding to the elements that can be launched first by the boot automaton 24, namely the bootstrap package 22 and the first additional configuration file 26. The first functional level N1 then includes the primary table or tables 42, the secondary table or tables 44P associated with the degraded mode of operation, and the tertiary table or tables 46P associated with said degraded mode.

The avionics system 10 then includes a second functional level N2 typically including the secondary table 44O associated with the operational mode of operation OPS, also called the operational secondary table 44O, and one or a plurality of tertiary system tables 46SO also associated with the operational mode OPS, as well as in addition, one or a plurality of auxiliary tables 58. The second functional level N2 is linked to the first functional level N1, the elements of the second functional level N2 being suitable for being called by a corresponding element of the first functional level N1.

The avionics system 10 then includes a third functional level N3 typically including the set of application partitions 12 and one or a plurality of system partitions 30. The tertiary application tables 46AO are then included in the third functional level N3, each being as such included in a corresponding application partition 12. The third functional level N3 is linked to the second functional level N2 and to the first functional level N1, e.g. the system partition 30 being run in degraded mode, and then called directly by the bootstrap package 22 or by the first additional configuration file 26. Each application partition 12 is typically called by a corresponding element of the second functional level N2, namely by the operational secondary table 44O or by a respective auxiliary table 58.

The avionics system 10 finally includes a fourth functional level N4 typically including one or a plurality of supplementary software applications 56. The fourth functional level N4 is linked to the third functional level N3, each supplementary application 56 typically being called by a respective application partition 12, in particular by the corresponding avionics software application 50.

According to the invention, the avionics system 10 can comprise at least one additional configuration file among the first additional configuration file 26, a second additional configuration file 60 and a third additional configuration file 62, each additional configuration file 26, 60, 62 including at least one resource configuration table of a type selected among the first type, HWCT, the second type, MGCT, and the third type, HACT. The first additional configuration file 26 typically includes a table of the first type, HWCT, as well as, as an optional supplement, a table of the second type, MGCT, for the degraded mode of operation and/or a table of the third type, HACT, for said degraded mode. The second additional configuration file 60 includes a configuration table of the second type, MGCT, and/or a configuration table of the third type, HACT. The third additional configuration file 62 typically includes a configuration table of the third type, HACT. Advantageously, each of the first, second and third additional configuration files 26, 60, 62 includes only the at least one configuration table of a type chosen among the first HACT, second MGCT and third HACT types, and each of the first, second and third additional configuration files 26, 60, 62 preferentially consists of said at least one configuration table of the aforementioned type.

Advantageously, the avionics system 10 comprises, in the storage memory 36, at least one additional configuration file 26, 60, 62, and preferentially a plurality of additional configuration files 26, 60, 62 among the first 26, second 60 and third 62 additional configuration files.

The boot automaton 24 is configured to check whether an additional configuration file 26, 60, 62 is present in the storage memory 36, and to then launch the additional configuration file 26, 60, 62, each table of the additional configuration file 26, 60, 62 being then used instead of a respective table of the same type among the primary 42, secondary 44O, 44P, tertiary system 46SO, 46P and tertiary application 46AO tables.

A skilled person would observe that if, when checking for the presence of said additional configuration file, the storage memory 36 does not contain any additional configuration files 26, 60, 62, then the boot automaton 24 is configured to launch the bootstrap package 22, in the absence of said additional configuration file 26, 60, 62.

Advantageously, if the additional configuration file 26 includes a table of the first type, HWCT, then the boot automaton 24 is configured to launch the additional configuration file 26 before the bootstrap package 22.

In addition, the boot automaton 24 is configured to launch the additional configuration file 26, 60, 62 only if at least one launch condition is met. Each launch condition is an authenticity check of the additional configuration file or an integrity check of the additional configuration file.

According to said addition, the boot automaton 24 is preferentially configured to launch the additional configuration file 26, 60, 62 only if all the launch conditions are met, i.e. if the additional configuration file 26, 60, 62 is both authentic and intact.

Preferentially, the bootstrap package 22 and the first additional configuration file 26 each include at most one configuration table of the first type, HWCT.

Advantageously, if the first additional configuration file 26 includes a configuration table of the first type, HWCT, then the configuration values of hardware resources contained in said table each belong to ranges of values for which the computer platform 15 has been previously certified.

As an optional addition, the bootstrap package 22 and/or the first additional configuration file 26 include a plurality of configuration tables of the second type, MGCT, and/or a plurality of configuration tables of the third type, HACT.

Different examples of embodiments of the invention will now be described with reference to FIGS. 2-7.

Figure 2:
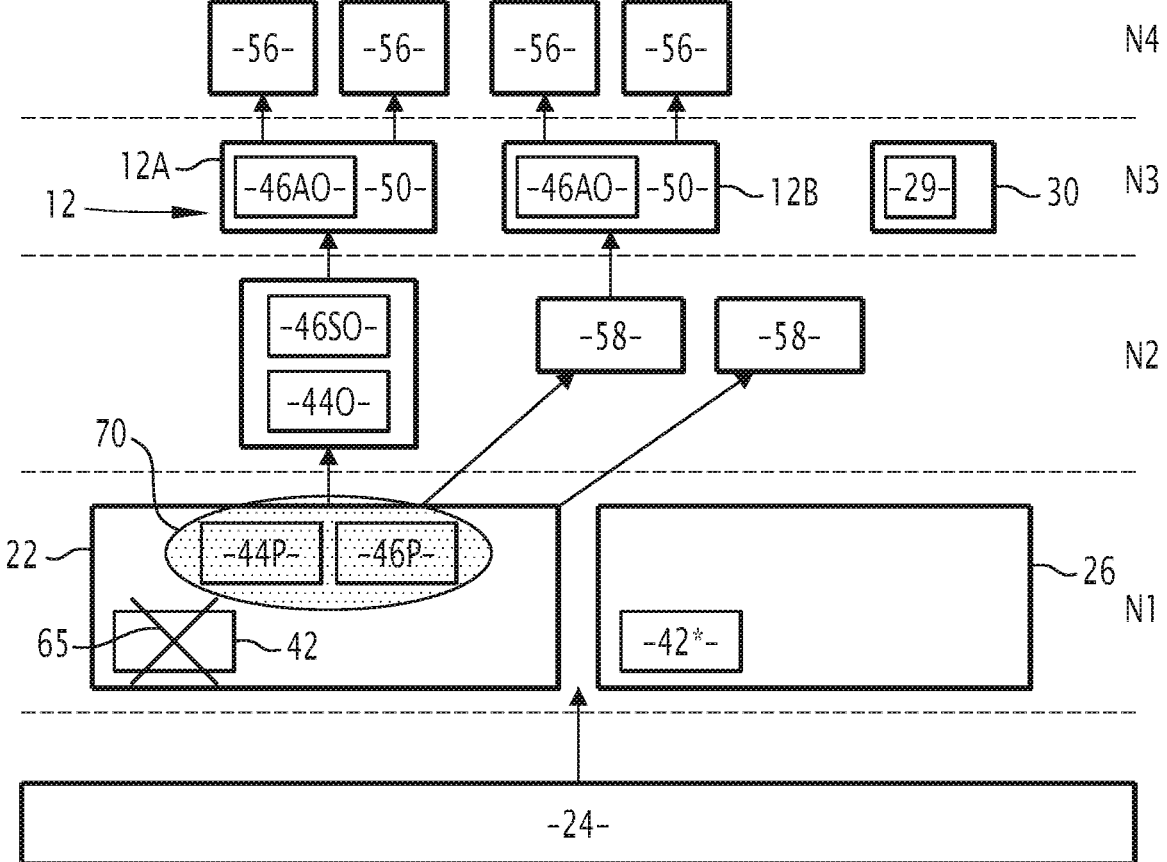
FIG. 2 is a view illustrating a first example of implementation of the invention, in the operational mode of operation of the platform, where the avionics system comprises a first additional configuration file including a configuration table of the first type, used instead of the primary table.

In the example shown in FIG. 2, the avionics system 10, and in particular the computer platform 15, includes the first additional configuration file 26, while not including any other additional configuration file. The bootstrap package 22 includes the primary table 42, as well as the secondary table 44P and the tertiary table 46P associated with the degraded mode of operation PDL.

In the example shown in FIG. 2, the first additional configuration file 26 includes only one configuration table of the first type, HWCT, e.g. a new version of the primary table 42, the new version being denoted by 42*. In said example, the first additional configuration file 26 does not include a configuration table of the second type, MGCT, or of the third type, HACT.

When the first additional configuration file 26 is launched by the boot automaton 24, the new version of the primary table 42* included in the first additional file 26 is then used instead of the primary table 42 of the bootstrap package 22. In other words, the primary table 42 of the bootstrap package is then bypassed by the new version of the primary table 42* included in the first additional configuration file 26.

In general, in the examples shown in FIGS. 2-7, each table circumvented by another table of a respective additional configuration file 26, 60, 62 is crossed out by a cross 65. In the example shown in FIG. 2, the primary table 42 of the bootstrap package is then crossed out by the cross 65.

The example shown in FIG. 2 corresponds to the operational mode of operation OPS, and the secondary 44P and tertiary 46P tables associated with the degraded mode PDL are then not used.

In general, in the examples shown in FIGS. 2-7, the elements not used by the mode of operation considered in the associated example are masked by an elliptical shape 70. In the example shown in FIG. 2, the secondary table 44P and the tertiary 46P tables are then masked by the elliptical shape 70.

Figure 3:
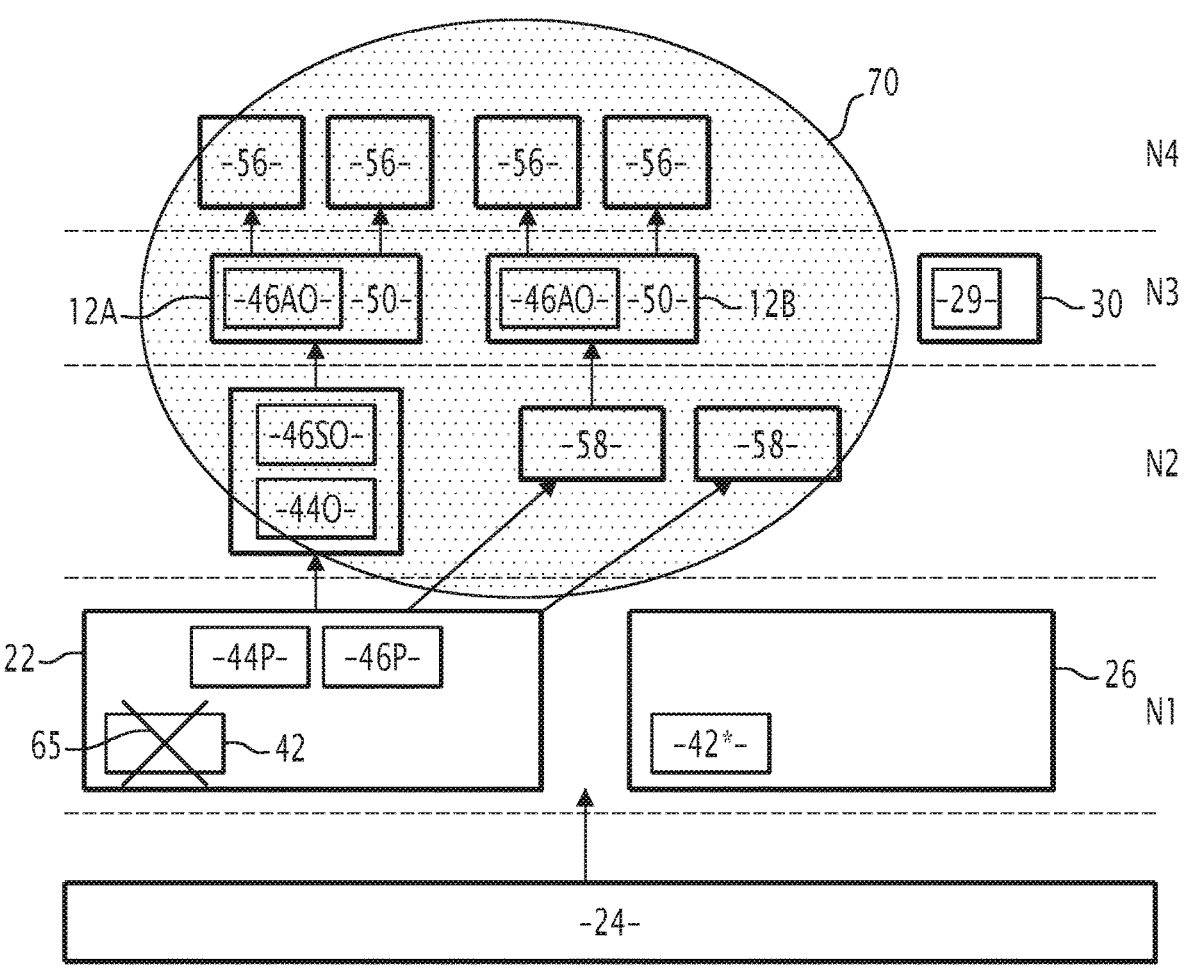
FIG. 3 is a view similar to the view shown in FIG. 2, in the degraded mode of operation of the platform.

In the example shown in FIG. 3, the avionics system 10, and in particular the computer platform 15, includes the same elements as in the example shown in FIG. 2, and the example shown in FIG. 3 differs from the example shown in FIG. 2 in terms of the mode of operation, the example corresponding to the degraded mode of operation PDL.

In the same way as in the example shown in FIG. 2, when the first additional configuration file 26 is launched by the boot automaton 24 after the computer platform 15 has been powered up, the new version of the primary table 42* included in the first additional file 26 is used instead of the primary table 42 in the bootstrap package 22.

Unlike the example shown in FIG. 2, the secondary 44P and tertiary 46P tables associated with the degraded mode of operation are now used this time, and the tables of the second, MGCT, and third, HACT, types implemented are then the tables of the bootstrap package 22, the first additional configuration file 26 including only the new version of the primary table 42* of the first type, HWCT, and not including a configuration table of the second type, MGCT, or of the third type, HACT. In other words, among the tables included in the bootstrap package 22, only the primary table 42 is circumvented and then represented crossed-out by the cross 65, the secondary table 44P and the tertiary table 46P being used normally.

Since the example shown in FIG. 3 corresponds to the PDL degraded mode of operation, system partition 30 is run after the bootstrap package 22 is implemented. The other elements of the second, third and fourth functional levels N2, N3, N4 are not used, and are then masked by the elliptical shape 70.

Figure 4:
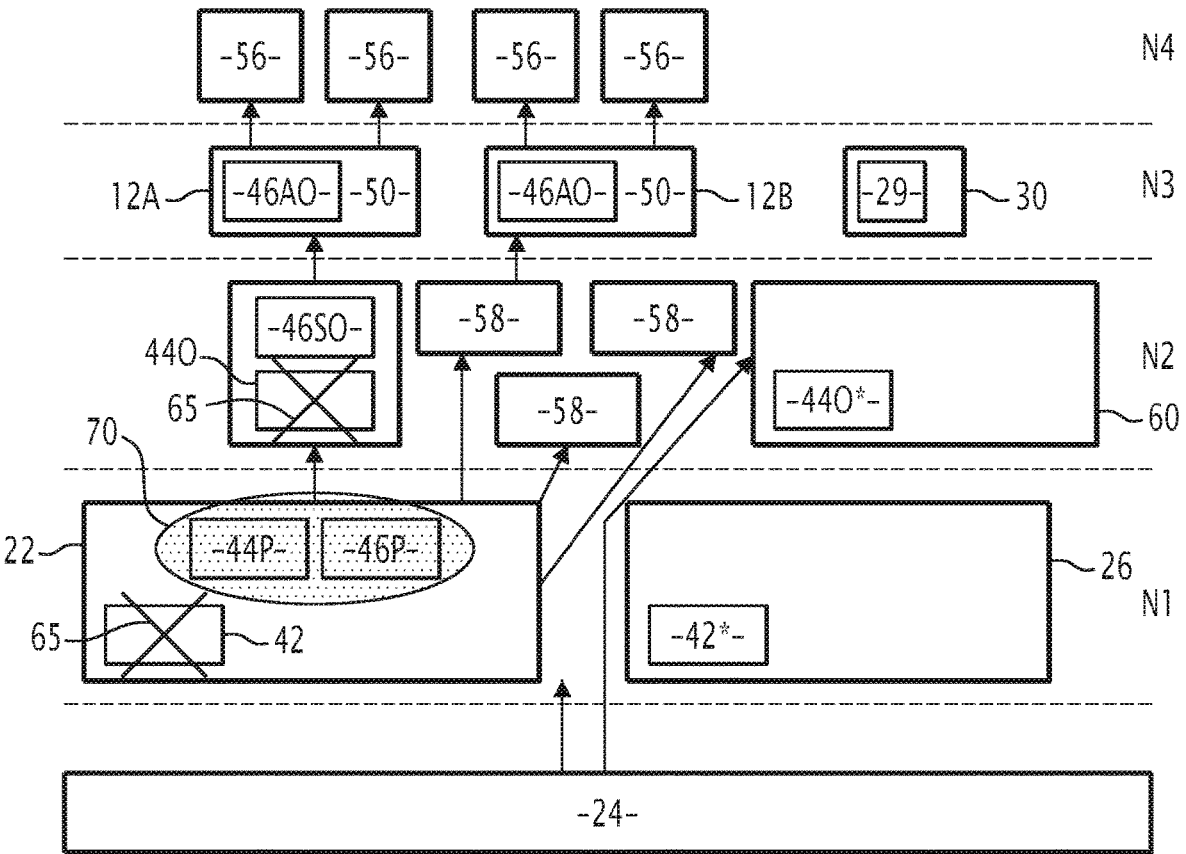
FIG. 4 is a view illustrating a second example of implementation of the invention, in operational mode of operation, where the avionics system includes both the first additional configuration file including the configuration table of the first type and a second additional configuration file including a configuration table of the second type, each additional configuration file table being then used instead of a respective table of the same type initially stored in the avionics system.

In the example shown in FIG. 4, the avionics system 10 includes the same elements as in the examples shown in FIGS. 2 and 3, and further includes the second additional configuration file 60 including a configuration table of the second type, MGCT, e.g. a new version of the secondary table 44O associated with the operational mode of operation OPS, the new version being denoted by 44O*.

In a similar way to the example shown in FIG. 2, the example shown in FIG. 4 corresponds to the operational mode OPS, and the secondary 44P and tertiary 46P tables associated with the degraded mode PDL are then not used, the tables 44P, 46P then being masked by the elliptical shape 70.

In the same way as in the examples shown in FIGS. 2 and 3, when the first additional configuration file 26 is launched by the boot automaton 24 after the computer platform 15 has been powered up, the new version of the primary table 42* included in the first additional file 26 is used instead of the primary table 42 in the bootstrap package 22.

The second additional configuration file 60 is then also launched by the boot automaton 24, the new version of the secondary table 44O* associated with the operational mode OPS being used instead of the table of the second functional level N2 initially stored in the storage memory 36.

In the example shown in FIG. 4, the circumvented tables are thus the primary table 42 of the bootstrap package 22 and the initial secondary table 44O associated with the OPS operational mode, the two tables then being represented crossed-out by the cross 65.

Figure 5:
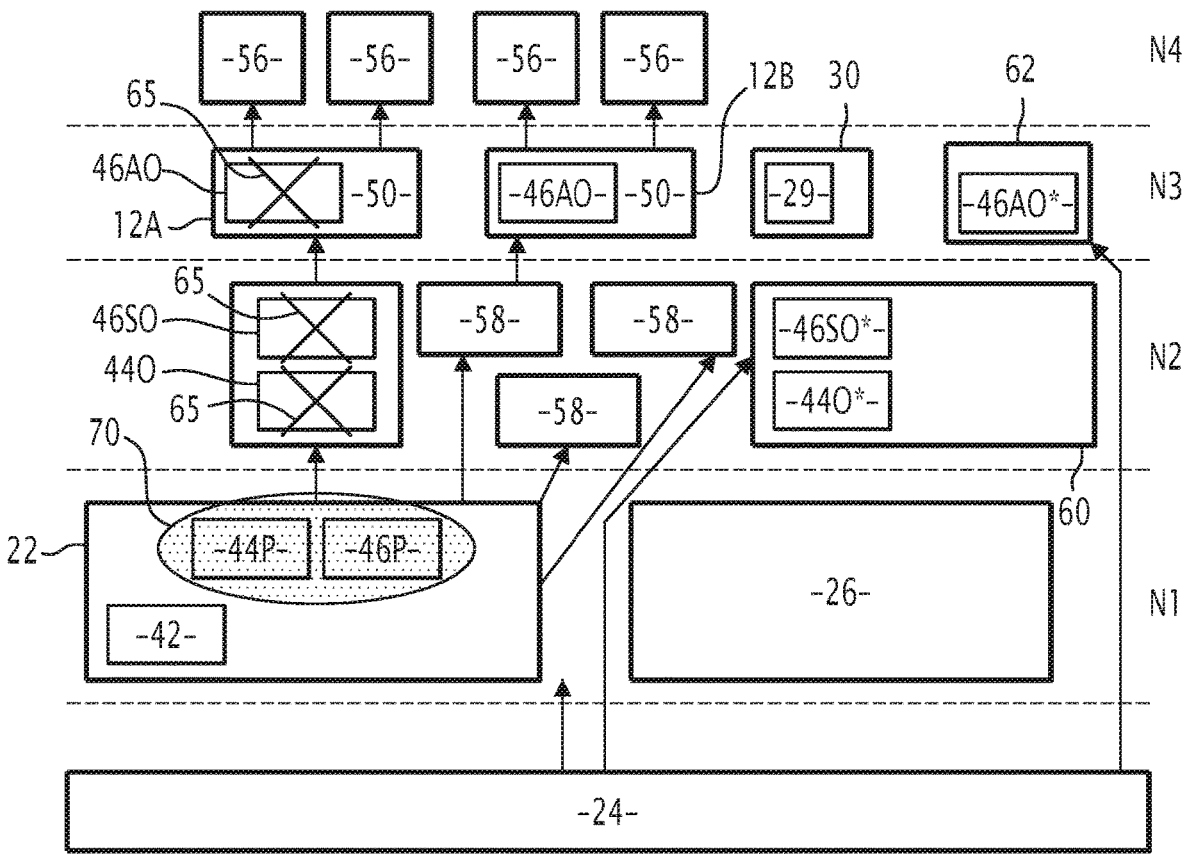
FIG. 5 is a view illustrating a third example of implementation of the invention, in the operational mode of operation, where the avionics system includes both the second additional configuration file including a configuration table of the second type and a configuration table of the third type, and a third additional configuration file including a configuration table of the third type, each additional configuration file table the being used instead of a respective table of the same type initially stored in the avionics system.

The example shown in FIG. 5 is similar to the example shown in FIG. 4, except that in the example shown in FIG. 5 the avionics system 10 further comprises the third additional configuration file 62 including a configuration table of the third type, HACT, e.g. a new version of the tertiary application table 46AO of the first application partition 12A, the new version being denoted by 46AO*.

Another difference between the examples shown in FIGS. 4 and 5 is that in the example shown in FIG. 5, the second additional configuration file 60 includes both a configuration table of the second type, MGCT, e.g. the new version of the operational secondary table 44O*, and a configuration table of the third type, HACT, e.g. a new version of a respective system tertiary table 46SO, the new version being denoted by 46SO*, so that both the operational secondary table 44O and the respective system tertiary table 46SO are then circumvented.

A final difference between the examples shown in FIGS. 4 and 5 is that in the example shown in FIG. 5, the first additional configuration file 26 is empty and does not have a configuration table of the first type, HWCT, or is absent, or is not authentic and/or intact, so that the primary table 42 of the bootstrap package 22 is not circumvented and is used by the boot automaton 24.

In the example shown in FIG. 5, the circumvented tables are thus the initial secondary table 44O associated with the operational mode OPS, the respective system tertiary table 46SO and the application tertiary table 46AO of the first application partition 12A, the three tables being then represented crossed-out by the cross 65.

Figure 6:
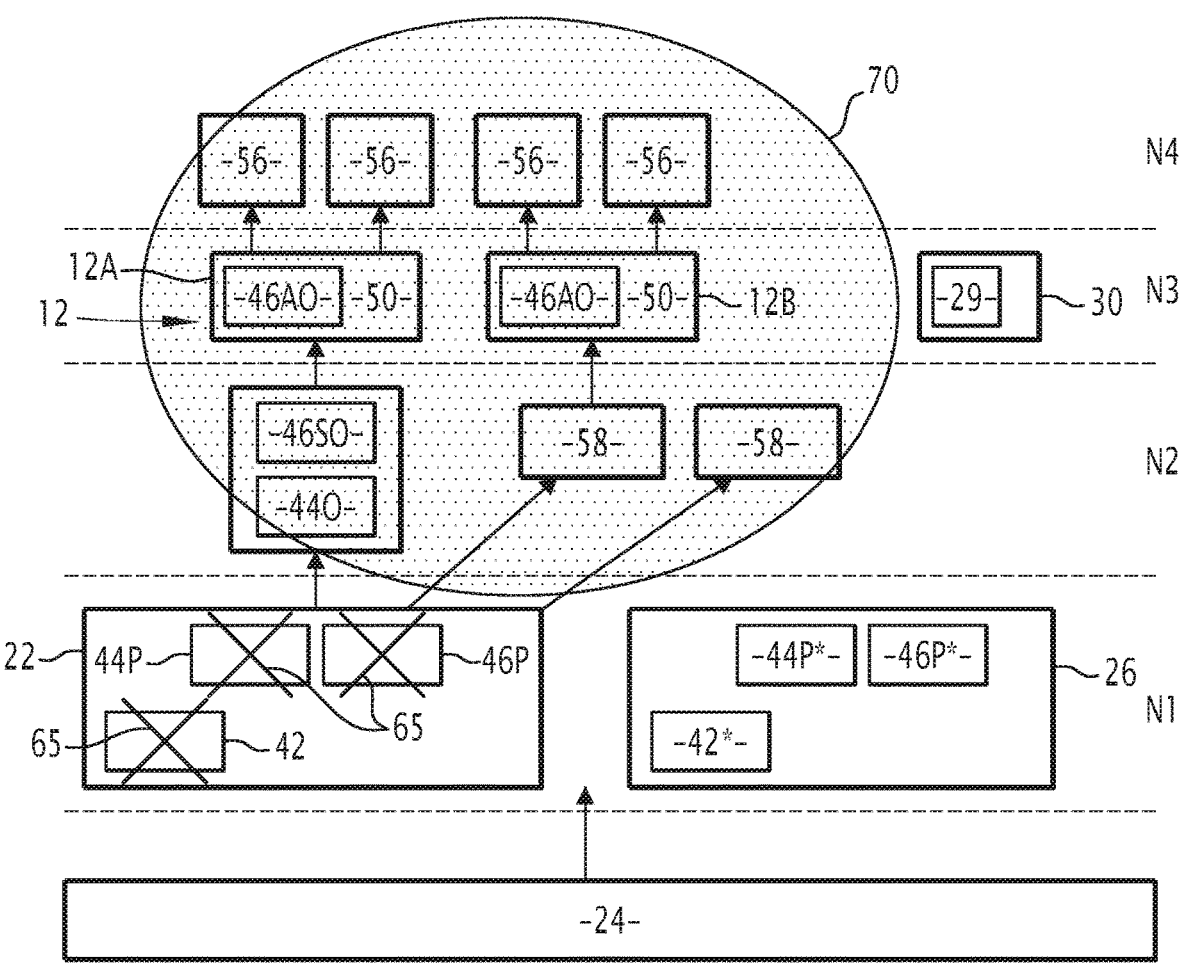
FIG. 6 is a view illustrating a fourth example of implementation of the invention, in the degraded mode of operation, where the avionics system comprises the first additional configuration file including both the first type configuration table and second and third type configuration tables, then used instead of respective primary, secondary and tertiary tables.

The example shown in FIG. 6 is similar to the example shown in FIG. 3, except that in the example shown in FIG. 6, the first additional configuration file 26 includes both a configuration table of the first type, HWCT, e.g. the new version of the primary table 42*, a configuration table of the second type, MGCT, e.g. a new version of the secondary table 44P associated with the degraded mode PDL, the new version being denoted by 44P*, and also a configuration table of the third type, HACT, e.g. a new version of the tertiary table 46P associated with the degraded mode PDL, the new version being denoted by 46P*.

In the example shown in FIG. 6, the circumvented tables are thus the primary table 42, and the secondary table 44P and the tertiary table 46P associated with the degraded mode PDL, the three tables of the bootstrap package 22 being then represented crossed-out by the cross 65.

Since the example shown in FIG. 6 corresponds to the degraded mode of operation PDL, the system partition 30 is run after the implementation of the first additional configuration file 26. The other elements of the second, third and fourth functional levels N2, N3, N4 are not used, and are then masked by the elliptical shape 70.

Figure 7:
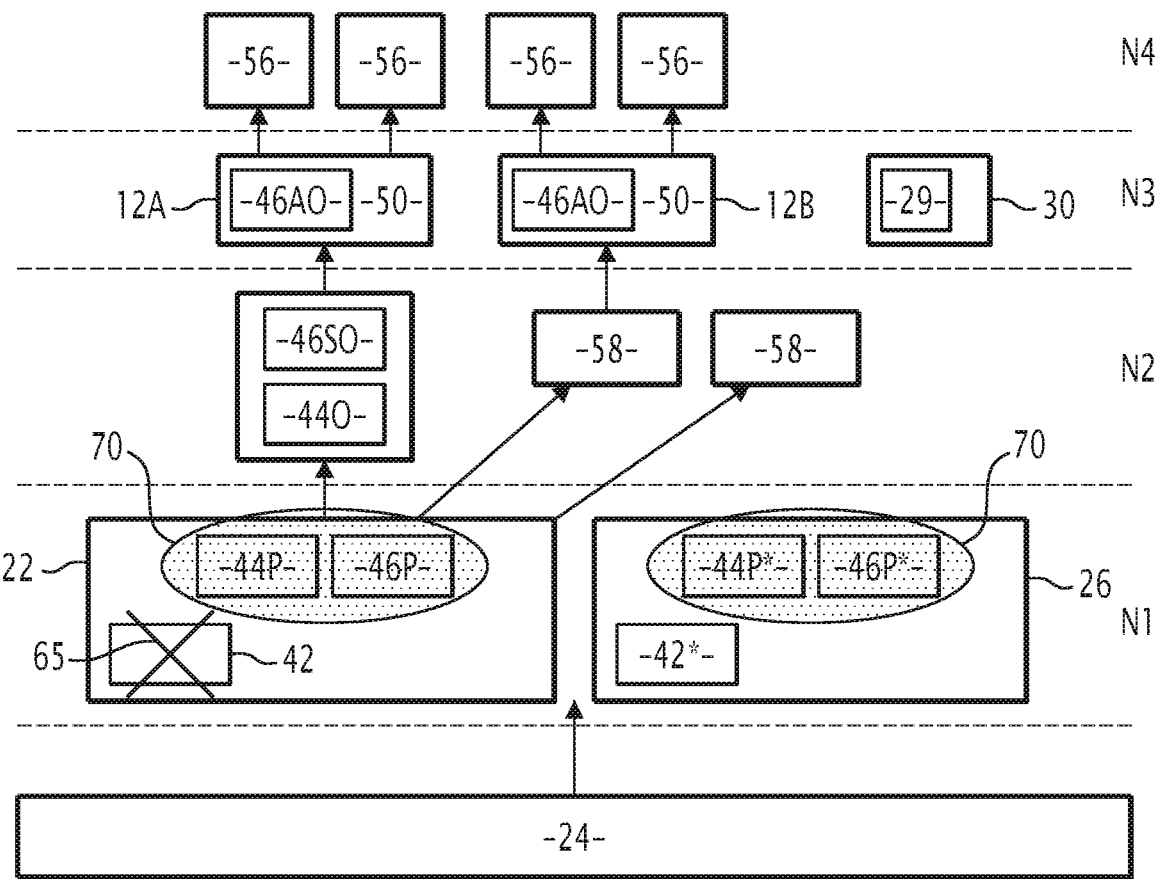
FIG. 7 is a view similar to the view shown in FIG. 6, in the operational mode of operation, wherein the configuration tables of the second and third types included in the first additional configuration file are then not used.

In the example shown in FIG. 7, the avionics system 10, and more particularly the computer platform 15, includes the same elements as in the example shown in FIG. 6, and the example shown in FIG. 7 differs from the example shown in FIG. 6 in terms of the mode of operation, the example corresponding to the operational mode OPS.

In the same way as in the example shown in FIG. 6, when the first additional configuration file 26 is launched by the boot automaton 24 after the computer platform 15 has been powered up, the new version of the primary table 42\* included in the first additional file 26 is used instead of the primary table 42 in the bootstrap package 22.

However, unlike in the example shown in FIG. 6, the secondary 44P and tertiary 46P tables associated with the degraded mode PDL—whether the tables involved are the tables of the bootstrap package 22 or the tables of the first additional configuration file 26—are not used and are then masked by the elliptical shape 70.

In the example shown in FIG. 7, the only table circumvented is thus the primary table 42 of the bootstrap package 22 which is then represented crossed-out by the cross 65.

A skilled person would then understand that the different possible cases for the avionics system 10 according to the invention, are the following:

presence of the first additional configuration file 26, but not of the second and third additional configuration files 60, 62: the table(s) circumvented are then the tables of the bootstrap package 22 for which a new version is present in the first additional configuration file 26, and also taking into account the mode of operation, the secondary 44P and tertiary 46P tables being used only in degraded mode of operation PDL;

presence of the second additional configuration file 60, but not of the first and third additional configuration files 26, 62: the circumvented table or tables are the initial secondary table 44O associated with the operational mode OPS and/or one or a plurality of system tertiary tables 46SO for which a new version is present in the second additional configuration file 60;

presence of the third additional configuration file 62, but not of the first and second additional configuration files 26, 60: the circumvented table or tables are one or a plurality of tertiary application tables 46AO for which a new version is present in the third additional configuration file 62;

presence of the first and second additional configuration files 26, 60, but not of the third additional configuration file 62, along with the circumvention, as described hereinabove, of the tables for which a new version is present in the additional configuration files 26, 60;

presence of the second and third additional configuration files 60, 62, but not of the first additional configuration file 26, along with the circumvention, as described hereinabove, of the tables for which a new version is present in the additional configuration files 60, 62;

presence of all the additional configuration files, i.e. the first, second and third additional configuration files 26, 60, 62, along with the circumvention, as described hereinabove, of tables for which a new version is present in the additional configuration files 26, 60, 62.

The boot sequence of the avionics system 10 according to the invention will now be explained with reference to the flowchart shown in FIG. 8.

When the avionics system 10, and thus the computer platform 15 contained therein, is powered up, the boot automaton 24 is run first by the processor 32, as represented by the arrow F1.

Figure 8:
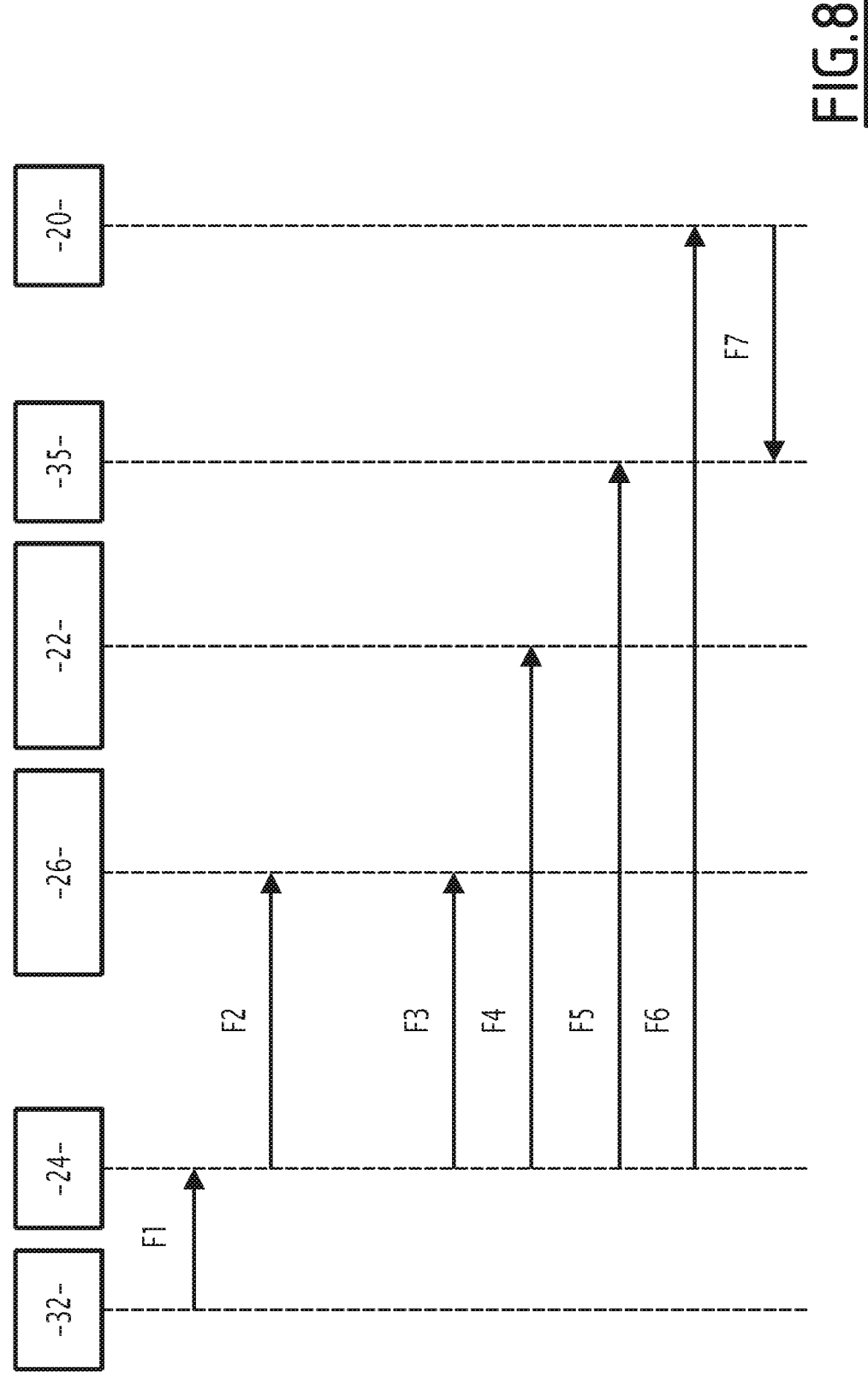
FIG. 8 is a flowchart representing a boot sequence of the avionics system shown in FIG. 1, with checking whether at least one additional configuration file is present.

The boot automaton 24 then starts by looking at whether the first additional configuration file 26 is present in the storage memory 36 at a predefined location provided for this purpose, the check for presence being represented in FIG. 8 by the arrow F2.

If the first additional configuration file 26 is present at such location in the storage memory 36, the boot automaton 24 advantageously checks the authenticity and integrity of the first additional configuration file 26, as represented by the arrow F3, and if the check is positive, i.e. if the first additional configuration file 26 is both authentic and intact, the boot automaton 24 will then copy into the random-access memory 35, each table contained in the first additional configuration file 26.

If, during the check for presence previously performed according to the arrow F2, the boot automaton 24 has determined that no additional configuration file 26 was present in the storage memory 36, or that a file was present but without a table, then the boot automaton 24 launches the bootstrap package 22, as represented by the arrow F4, and will then use, more particularly, the configuration tables that the bootstrap package 22 contains.

The boot automaton 24 then copies into the random-access memory 35, as represented by the arrow F5, the table or tables resulting from the checks performed previously according to the arrows F2 and F3. In other words, the boot automaton copies into the random-access memory 35 each table contained in the first additional configuration file 26, if the latter is determined to be present during the check according to the arrow F2, then advantageously as authentic and intact during the check according to the arrow F3. Otherwise, it is the configuration table or tables contained in the bootstrap package 22 that are copied into the random-access memory 35.

After the copying of the configuration tables into the random-access memory 35, the boot automaton 24 runs an initialization program contained in the operating system 20, as represented by the arrow F6, and the latter will begin by reading the configuration table(s) previously copied into the random-access memory 35, as represented by the arrow F7. The boot sequence of the avionics system 10 according to the invention is then completed.

The boot sequence described hereinabove concerns the case with the presence of the first additional configuration file 26, but not the second and third additional configuration files 60, 62, and a skilled person would understand that the boot sequence is similar in case of the presence of the second 60 and/or third 62 additional configuration files, the boot automaton 24 also taking care of checking for the presence of the second 60 and/or third 62 additional configuration files at the predefined locations, provided for this purpose; then advantageously to check the authenticity and/or integrity thereof; and finally to copy into a random-access memory, the tables contained in the additional files if the aforementioned check or checks are positive.

A skilled person would also understand that, in a respective case with a plurality of additional configuration files, the checks are carried out in ascending order of the names thereof, i.e. e.g. first for the first additional configuration file 26, then for the second additional configuration file 60 and finally for the third additional configuration file 62, which takes place in the case with all the additional configuration files.

Thereby, the additional configuration file(s) 26, 60, 62 including at least one resource configuration table facilitates the taking into account of changes in the context of running the software application(s) 50 by allowing new configuration values to be added after the design of said software application(s) 50.

The additional configuration file(s) 26, 60, 62 serve in particular to retain the benefit of the certification carried out, and then to avoid a new certification, or recertification, and thereby significantly reducing the required technical checks and tests.

Furthermore, each additional configuration file 26, 60, 62 consisting of the at least one configuration table is easier to generate and faster to load than a new version of the bootstrap package 22 that would be modified in order to insert therein the new configuration values. As a result, it is possible to improve the performance, in particular in terms of running and calculation time, of the avionics electronic system 10 according to the invention.

The avionics electronic system 10 according to the invention then serves to facilitate the taking into account of changes in the context of running the avionics software applications 50, while significantly reducing the technical checks and tests resulting from the changes and having an improved system performance during such taking into account.

The invention claimed is:

1. An avionics system carried on board an aircraft, the avionics system comprising a computer platform running a set of application partitions, comprising hardware resources and hosting an operating system, the hardware resources comprising a processor, a random-access memory, and a storage memory, the storage memory comprising:
   a bootstrap package comprising:
      a kernel;
      at least one resource driver;
      a set of system partitions, each system partition including at least one service of the operating system; and
      a primary resource configuration table being of a first type containing configuration values of said hardware resources;
   at least one secondary resource configuration table, each secondary resource configuration table being of a second type comprising configuration values of resources used by a respective set of application or system partitions, the second type being distinct from the first type;
   a set of system tertiary resource configuration tables for said set of system partitions, each system tertiary resource configuration table being of a third type comprising configuration values of resources used by a respective system partition, the third type being distinct from the first type and from the second type; and
   the set of application partitions, each application partition comprising:
      an avionics software application;
      an application tertiary resource configuration table, each application tertiary resource configuration table being of the third type and containing configuration values of resources used by the respective application partition; and
   a boot automaton executed first after the platform is powered up and configured to launch said bootstrap package, wherein said boot automaton is configured to check whether a configuration file is present in said storage memory, and then to launch the configuration file, the configuration file comprising at least one resource configuration table of a type chosen from the first, second and third types, the at least one resource configuration table of the configuration file being then used instead of a respective table of the same type among the primary resource configuration table, the at least one secondary resource configuration table, the set of system tertiary resource configuration tables, and the application tertiary resource configuration table provided in each application partition in the set of application partitions.

2. The avionics system according to claim 1, wherein if upon checking for the presence of the configuration file, said storage memory contains no configuration files, then said boot automaton launches said bootstrap package.

3. The avionics system according to claim 1, wherein if the configuration file includes a table of the first type, then said boot automaton launches the configuration file before launching said bootstrap package.

4. The avionics system according to claim 1, wherein said boot automaton launches the configuration file only if the configuration file is at least authentic or intact.

5. The avionics system according to claim 4, wherein said boot automaton is configured to launch the configuration file only if the configuration file is both authentic and intact.

6. The avionics system according to claim 1, wherein said computing platform operates according to a mode of operation chosen at least from a degraded mode where only said set of system partitions is executable among said sets of system partitions and application partitions, and an operational mode where said sets of system partitions and application partitions are each executable.

7. The avionics system according to claim 6, further comprising a resource configuration table of the second type for each of the modes of operation among the degraded mode and the operational mode, the resource configuration table of the second type for the degraded mode containing configuration values of resources used by said set of system partitions and the resource configuration table of the second type for the operational mode containing configuration values of resources used by said set of application partitions.

8. The avionics system according to claim 6, further comprising, for each system partition, a resource configuration table of the third type for each of the modes of operation among the degraded mode and the operational mode, each resource configuration table of the third type for the degraded mode associated with a respective system partition for the degraded mode and containing configuration values of resources used by the respective system partition for the degraded mode, and each resource configuration table of the third type for the operational mode associated with a respective system partition for the operational mode and containing configuration values of resources used by the respective system partition in the operational mode.

9. The avionics system according to claim 1, wherein said bootstrap package and the configuration file each include at most one configuration table of the first type.

10. The avionics system according to claim 1, wherein if the configuration file includes a configuration table of the first type, then configuration values of hardware resources contained in the configuration table of the first type included in the configuration file each belong to value ranges for which said computing platform has been previously certified.

11. The avionics system according to claim 1, wherein said bootstrap package and/or the configuration file include a plurality of configuration tables of the second type and/or a plurality of configuration tables of the third type.

12. The avionics system according to claim 1, wherein said storage memory further comprises at least one configuration file.

13. The avionics system according to claim 12, further comprising a plurality of configuration files.

14. The avionics system according to claim 12, further comprising a first configuration file including at least one configuration table, one of which is of the first type, and at least one other configuration file including at least one configuration table of a type chosen from the second and third types.

15. The avionics system according to claim 1, wherein each configuration file consists of one or more configuration tables of a type chosen from the first, second and third types.

\* \* \* \* \*